United States Patent
Toggenburger

(10) Patent No.: US 9,550,430 B2
(45) Date of Patent: Jan. 24, 2017

(54) METHOD FOR DYNAMIC AND FORWARD MANAGEMENT OF THE BATTERY RECHARGING WITH ELECTRIC POWER

(71) Applicant: PARKNPLUG, Saint-Andre-les-Vergers (FR)

(72) Inventor: Pascal Toggenburger, La Riviere de Corps (FR)

(73) Assignee: PARKNPLUG, Saint-Andre-les-Vergers (FR)

( * ) Notice: Subject to any disclaimer, the term of this patent is extended or adjusted under 35 U.S.C. 154(b) by 262 days.

(21) Appl. No.: 14/277,790

(22) Filed: May 15, 2014

(65) Prior Publication Data
US 2014/0340038 A1    Nov. 20, 2014

(30) Foreign Application Priority Data
May 16, 2013   (FR) ...................... 13 54390

(51) Int. Cl.
*H02J 7/00*      (2006.01)
*B60L 11/18*     (2006.01)
(Continued)

(52) U.S. Cl.
CPC .............. *B60L 11/1846* (2013.01); *B60L 3/12* (2013.01); *B60L 11/1824* (2013.01); *B60L 11/1844* (2013.01); *G06Q 10/06* (2013.01); *H02J 7/0027* (2013.01); *H02J 7/041* (2013.01); *B60L 2240/70* (2013.01); *B60L 2240/80* (2013.01); *B60L 2260/58* (2013.01); *H02J 2007/0096* (2013.01); *Y02E 60/721* (2013.01); *Y02T 10/7005* (2013.01); *Y02T 10/7055* (2013.01); *Y02T 10/7072* (2013.01); *Y02T 10/7291* (2013.01);
(Continued)

(58) Field of Classification Search
CPC   H02J 7/0022; H02J 7/0027; H02J 2007/0096; H02J 7/041; B60L 11/1824; B60L 11/1844; B60L 11/1846; B60L 2240/70; B60L 2240/80; B60L 2260/58; B60L 3/12
USPC .......................................... 320/109; 700/291
See application file for complete search history.

(56) References Cited

U.S. PATENT DOCUMENTS

2008/0284379 A1\* 11/2008 Hirano ................ B60L 11/1809
                                                          320/150
2011/0193522 A1\*  8/2011 Uesugi .................... B60L 1/003
                                                          320/109
2012/0245750 A1\*  9/2012 Paul ....................... G06Q 50/06
                                                          700/291

FOREIGN PATENT DOCUMENTS

JP    2012165599 A    8/2012
WO    2011118193 A1   9/2011

\* cited by examiner

*Primary Examiner* — Nathaniel Pelton
(74) *Attorney, Agent, or Firm* — Andrew W. Chu; Craft Chu PLLC

(57) ABSTRACT

The method for dynamic and forward management of the recharging of batteries with electric power includes retrieving at least one data record relating to a previous recharging of each battery in the form of a recharging time extending from a time of beginning of the power supply to a time of ending of the power supply. The method also includes determining a forward duration of recharging of each battery from a forward time of beginning of power supply to a forward time of ending of the supply and determining a schedule for recharging while sequencing the forward times of recharging determined for each battery. The durations follow each other and overlap at least partially over time, while applying each forward duration to the recharging, (Continued)

from forward time of beginning of power supply to forward time of ending of power supply.

4 Claims, 1 Drawing Sheet

(51) Int. Cl.
*B60L 3/12* (2006.01)
*H02J 7/04* (2006.01)
*G06Q 10/06* (2012.01)

(52) U.S. Cl.
CPC ............. *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01)

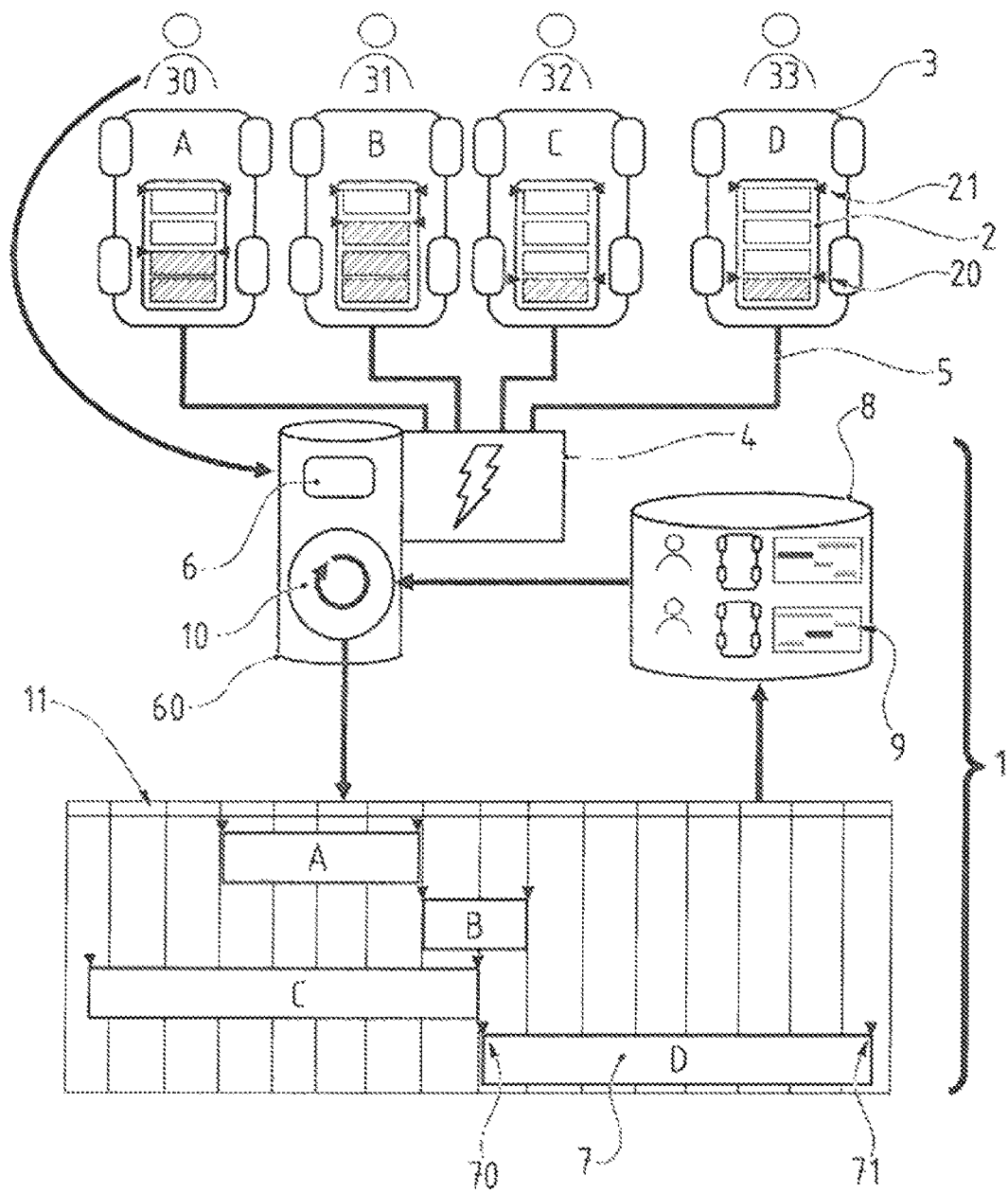

METHOD FOR DYNAMIC AND FORWARD MANAGEMENT OF THE BATTERY RECHARGING WITH ELECTRIC POWER

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention falls within the field of dynamic management of battery recharging with electric power.

The invention relates in particular to a system of dynamic and forward management of battery recharging with electric power, in particular the method for implementing same.

Such a system will find a particular application in the management of battery recharging for a fleet of vehicles, especially vehicles provided with electric or hybrid powertrain.

It should be noted that these vehicles can consist, preferably, but not exclusively, of land vehicles, such as cars, motorcycles or scooters, but also eventually of marine or water vehicles such as boats, even aerial vehicles such as aircrafts.

2. Description of Related Art Including Information Disclosed Under 37 CFR 1.97 and 37 CFR 1.98

At present, the users of the electric vehicles carry out the recharging of their battery by connecting to a single point of power supply located on a site. This recharging takes place for a period during which each vehicle is parked, immobilized for the time required for fully or partially recharging the batteries, so as to achieve maximum battery life. This recharging period can take place during the night, at the user's home, or during daytime at his workplace.

Many problems arise because of the number of vehicles to be recharged relative to the point of power supply of said site. It is difficult to adapt this power to a number of vehicles likely to vary, to decrease, but most certainly to increase over time in the medium to long term. For these reasons of additional costs of installation and operation, it is difficult to contemplate an oversized power capacity of the point of supply in anticipation of the future, while less power could be enough.

Therefore, a recharging point is likely to become overloaded or to trip because the recharging of the vehicles occurs simultaneously over one and the same period, i.e. mainly off-peak periods. Conversely, because of the recharging times needed, it is not possible to contemplate recharging successively all vehicles over too short a period of immobilization.

It is therefore necessary to manage a schedule for recharging the batteries of a fleet of electric vehicles.

To this end, it has already been devised, through EP 2219278, to check the status of charge of each battery and to derive from same a sequence for recharging vehicles depending on the status of charge and the power available at the point of supply. In addition, this solution estimates a potential future consumption based on the current status of charge of each battery. In brief, a minimum level of charge to be achieved is calculated based on the discharge of the battery being observed. The beginning of the next use, corresponding to the start of the vehicle and to the end of recharging, also enters into consideration. Based on all these parameters, a schedule of simultaneous and successive recharging of all the vehicles is automatically calculated.

Although this solution allows to schedule the recharging of several cars, it is however not satisfactory because of the estimated aspect of the level of charge to be reached. A user may indeed use his vehicle during the week to go to his workplace, leading to a regular daily consumption, but not use it during the weekend, on Saturdays and Sundays. It will then only be necessary to contemplate its recharging before Monday morning. Conversely, a user may need his car during the weekend for larger trips, while he uses it less on weekdays. Infinite possibilities can be contemplated, which do not permit to have a minimum level of charge adapted to the next trip of the vehicle, or to best optimize the recharging and the amount of electricity being consumed.

Moreover, such a solution must necessarily communicate with the electrical management system of the vehicle, in order to retrieve information. Because of the disparities existing between two manufacturers, as well as the powers of each battery for a given vehicle, said solution must integrate communication means that provide such compatibility, which makes its design and implementation more complex. Therefore, in reality, this solution permits to manage the recharging schedule only for vehicles of the same manufacturer.

An alternative solution is described in U.S. 2011/193522, relating to a system for managing the affluence and access by a user to a network of recharging stations, each station was equipped with one or more terminals, i.e. several power-supplying points in the meaning of the present invention. The aim is here to remotely inform a user about the availability of a recharging terminal, then to permit him to book a time slot with an available terminal, the same terminal or a terminal located nearby in the same geographical area.

To this end, such a system indicates, at a user's request, the recharging schedule of one or more stations, while indicating the shortest time remaining before one of said stations becomes free and is vacant, permitting the user to then contemplate recharging his vehicle at that time. The user must then book a time slot for recharging, while indicating or not the recharging time he wishes. Once it has been booked, the user must go to the site for recharging.

It should be noted that this document provides for identifying the vehicle, in order to know whether it has already been recharged before, using the previous recharging time recorded at a server that remotely manages all the sites.

It is therefore a mere management of an agenda, which indicates when and for how long a station is free for a limited period, namely based on a duration of recharging already performed by a user identified in the system. In other words, said system uses the previous recharging time of a user as a basis for the duration of the minimum time slot he wishes to book, which said system compares with the time slots of availability of the terminals.

Such a system does in no way take into consideration the previous recharging times, but only the previous duration, in order to define and find an at least equal time slot to permit recharging the vehicle, said time slot corresponding to said recharging duration previously recorded at the level of said server.

More specifically, in this system, the assignment occurs by stacking, similar to a stack of the FIFO type, for "First In First Out". In other words, for a given station, a user must wait until the end of the previous recharging operations in order to be able to book the next available slot to perform its own recharging.

This solution does not at all take into consideration the calculation of the optimal time for recharging several vehicles based on the behavior of each user. Such an agenda management does not take into consideration a user who arrives earlier and should theoretically leave later, compared to another user who arrives later, but should theoretically leave earlier. The aim is only to make the recharging times follow each other in an agenda, without any possibility of making them overlap, nor explicitly taking into consideration the electrical power of the terminals. In addition, there exists no optimization of the system to come as close as possible to the nominal power limit of each power-supply point.

SUMMARY OF THE INVENTION

The aim of the present invention is to cope with the drawbacks of the state of the art by providing a system for dynamical and forward management of the battery recharging with electric power, through its method of implementation.

Such a system pretends to be capable of performing an intelligent management of the recharging of the batteries of any type of vehicle, regardless of its origin, the type of battery it carries or its current level of charge or the one to be reached. The invention therefore permits to eliminate the data related to the vehicles to be recharged.

To this end, such a management system contemplates only to record the mere electric-power consumption over a given time span for each vehicle, at each recharging. When this same vehicle is again recharged, the system retrieves the previously recorded information in order to know for how long the vehicle should be immobilized and the electric-power consumption it requires.

In short, said system stores data related to the recharging habits of each vehicle, analyzes them in order to automatically derive a recharging forecast for said vehicle. By grouping all the forecasts related to the fleet of vehicles, the invention determines at least one recharging period for each vehicle and a schedule of all the periods of recharging for the entire fleet of vehicles.

In particular, the invention provides for determining a recharging period based on the information from a duration of a recharging previously carried out, but especially its starting time and its ending time. In other words, the invention contemplates to peruse the users' habits, for sequencing the recharging of their vehicle. Such a solution permits to put in the first place the recharging of a user who arrived later at the point of recharging, but who must leave earlier than another user who would have arrived earlier, but whose time of departure is later.

Thus, the invention tries to match as best as possible the slots for recharging the vehicles, so that they follow each other and do not overlap, so that, if possible, all the recharging periods are shorter than the durations when summed.

Moreover, the invention seeks to optimize the recharging, by getting as close as possible to the power limit of the power-supply point. Indeed, the specific aim of the invention is one single recharging point, which several vehicles electrically connect to.

Due to its dynamic nature, said system can record the changes to the behavior of each vehicle and amend its schedule accordingly, conferring to same a nature of learning the evolutions of the users' habits.

In this respect, the identification of each vehicle is made possible thanks to the identification of its user, at the time of connecting the vehicle to the point of recharging. Indeed, in order to permit the recharging of a vehicle, the user must identify himself, especially by means of a personal badge, e.g. a name badge. Therefore, he is required to identify himself, prior to the recharging, in order for his electric-power consumption to be recorded in his account and to be billed to him. Thus, the invention readily provides for associating a vehicle with a user and for identifying a vehicle at each of its connections for its recharging.

To this end, such a method for dynamical and forward management of the battery recharging with electric power, wherein several cars each belonging to a user are provided with at least one rechargeable battery; when recharging each battery, each user and/or each vehicle is identified with identification means at the level of one single power-supply point, and the battery of each vehicle is electrically connected to said power-supply point for recharging each battery.

Said method is characterized in that it consists in:
retrieving at least one data record relating to a previous recharging of each battery in the form of a recharging time extending from a time of beginning of the power supply to a time of ending of the power supply;
based on the processing of said recorded data, determining a forward duration of recharging of each battery from a forward time of beginning of power supply to a forward time of ending of the supply; and
determining a schedule for recharging said vehicles while sequencing the forward times of recharging determined for each battery, said durations following each other and overlapping at least partially over time, while applying each forward duration to the recharging of each vehicle, from its forward time of beginning of power supply, which then becomes its actual time of beginning of power supply, to its forward time of ending of power supply.

Because of its way of management, by superposition of the recharging slots for several cars, based on the power of the power-supply point, the aim of the invention is an implementation for the management of at least three vehicles. Its effectiveness will be even more optimized for the management of a fleet of a dozen, even more, vehicles.

In addition, according to other additional non-restrictive features, the method can consist in determining a schedule for recharging several cars by sequencing the forward times of recharging determined for each battery.

Preferably, said sequencing of said schedule can be performed by calculating the electric powers required for recharging each battery over its forward duration of recharging, so that at any time the combination of said powers does not exceed the nominal power of said power-supply point.

According to one embodiment, said method can consist, when recharging a battery, in defining the time of ending of the power supply after a predefined period of time after said battery stops consuming electric power.

According to another embodiment, the identification of said user can consist in his authentication and in relating his personal information to said data record.

A peculiarity resides in that the system according to the invention intervenes at the time of electrically connecting the vehicle locally on the site, and not at a prior request by a user, performed remotely.

BRIEF DESCRIPTION OF THE DRAWINGS

Further features and advantages of the invention will become clear from the following detailed description of the non-restrictive embodiments of the invention, with reference to the attached FIGURE, which schematically represents the architecture of a specific exemplary implementation of the system according to the invention.

DETAILED DESCRIPTION OF THE DRAWINGS

The present invention relates to a method 1 for dynamic and forward management of the recharging of batteries 2 with electric power.

It should be noted that each battery 2 consists of electric-power storage means, in particular in the form of an electrochemical storage system. At least one battery 2, preferably several batteries, is aimed at being provided in a vehicle 3, namely a car.

Each battery 2 is designed rechargeable. For this recharging said battery 2 has to be connected to a power-supply point 4. The latter is unique in the meaning of the present invention. In other words, this is a point localized on one site, provided with several power sockets, which vehicles can be connected and electrically connected to.

Said power-supply point 4 is connected and electrically connected to an electric-power distribution and supply network. Thus, it is necessary to park each vehicle 3 near said power-supply point 4, in order to connect its battery 2 to same, namely through a line, such as a power-supply cable 5, provided with an adapted connector cooperating with a complementary connector located at the level of said point 4, namely in the form of electrical plugs or pins.

In addition, said power-supply point 4 has a nominal power, namely according to a given amperage, which it cannot exceed, without risking to trip, or even to be deteriorated. This limitation impedes the simultaneous recharging of a too large number of batteries 2. Once connected and supplied with electric power by the point 4, each battery 2 can be recharged for a given time, depending on its current status or level of charge 20. This period of time also depends on the speed of recharging of each battery 2, which decreases over time and depends on the number of recharges already carried out. Moreover, the duration of recharging is limited in time, until the user causes at a given time the disconnection from the power-supply point 4 when he takes his vehicle 3, or when the battery has reached its maximum level of charge 21.

Furthermore, each battery 2 is carried within a vehicle 3 that belongs to a user 30. According to the exemplary embodiment shown in the FIGURE, four vehicles A, B, C and D respectively belong to four different users 30, 31, 32 and 33.

In addition, each user is holder of an agreement for using the recharging system entered into with the owner of the recharging infrastructure supplying the power-supply point 4 with electric power. When recharging his vehicle 3, the latter and/or a user must therefore be identified with the power-supply point 4, so that the power consumption for recharging his battery 2 can be assigned and billed to him.

In this respect, the management system according to the invention comprises means 6 for identifying 6 each user and/or each vehicle 3. These identification means 6 are preferably located at the level of said power-supply point 4, namely in the form of an access terminal 60.

According to one embodiment, the identification means 6 can comprise means for authenticating each user, namely in the form of a card reader for reading a card belonging to said user. This card can be in the form of a badge, provided with a contact or contactless communication technology, namely a RFID chip (for "Radio Frequency Identification"). In addition, this badge incorporates a unique identification key serving as an identifier specific to said badge and, thus, to said user. This key is transmitted to the identification means 6, which checks its validity, in order to permit or not the recharging.

According to a specific embodiment, this identification can also include a step of inputting, through input means such as a keyboard, a personal password for each user.

According to another embodiment, these authentication means can be in the form of a carried-on software application, namely at the level of a portable terminal belonging to said user. The user authentication occurs thus remotely, via a wireless communication network connected to said terminal 60 and to the identification means. Thus, it is possible for a user to remotely identify himself with identification means 6, whereby a physical terminal 60 can be omitted.

According to yet another embodiment, the identification can occur directly by connecting said vehicle 3, the electrical connection means of which, such as the socket said cable 5 is provided with, can be provided with identification information, such as a serial number. This information will then be validated by the identification means, namely through a comparison with a remote database, in order to authenticate said vehicle 3 so connected and to permit its recharging.

Once it has been identified, said terminal can indicate to the user that the electric-power supply is permitted. In brief, the socket to which the user connects or will connect the power-supply cable 5 of his vehicle 3, is supplied with electric power by the network. This indication can be visual, namely in the form of a colored signal lamp, namely green color one when said socket is supplied and red color when it is not.

It is important to note that the system performs its processing only when the user connects the battery of his vehicle.

Then, once the vehicle 3 is connected and the power supply is permitted upon identification of the user, the battery 2 can be recharged. As mentioned above, this recharging is carried out during a period of recharging 7. At the end of this period 7 the supply has required a certain amount of electricity that is recorded by the system 1 for billing to the user.

Thus, the system 1 knows, for each battery 2 of a vehicle 3 of a user, the amount of electricity consumed over a given recharging period 7 from a time of beginning of the supply 70 to a time of ending of the supply 71. In brief, the system 1 is limited to only know the power-consumption parameters of the recharging of a battery 2 of a user, without worrying about the specific features of each vehicle and each battery 2, namely its current level of charge and a level to be reached.

Essentially, the invention takes into account the duration of recharging and the time at which it takes place, namely from a time of beginning to a time of ending. These times permit to know and determine recharging habits of the users, in order to determine their estimated current recharging period.

Moreover, it should be noted that the time of ending of the supply 71 may correspond to the time at which the battery 2 is fully recharged, having reached its maximum level of charge, or at which the user disconnects his vehicle for use before the end of complete recharging of its battery 2.

In addition, this information 9 can be recorded for each user, thereby relating all the data for recharging a battery A, B, C, D to its user 30, 31, 32, 33.

In particular, this data recording 9 can occur through adapted recording and storage means 8, namely in the form of a relational database.

Advantageously, the management system 1 according to the invention provides for using this data record 9 in order to process and to determine the forward duration of recharging of each vehicle and to optimize over time the recharging operations of several vehicles A, B, C, D.

To this end, the system 1 comprises means 10 for software processing of said data. These means 10 can be integrated in said terminal 60 or connected thereto via a communication network, namely a wireless network. Moreover, said processing means 10 are connected to said recording means 8 for receiving the data records 9.

Thus, these processing means 10 permit for each battery 2, based on at least one previous record of its data 9, preferably based on a combination or an average of several of its previous records, to determine a forward duration of recharging, from a forward time of starting of the power supply to a forward time of ending of the power supply.

Once it has been determined, the forward duration is applied to the recharging of the vehicle, from the forward time of starting of the power supply, which becomes the actual time of the starting of the power supply 70, until the forward time of ending of the power supply. Once it has been reached, the latter becomes the actual time of ending of power supply 71 corresponding to the end of the elapsed recharging time 7.

It should be noted that the latter can be changed at the end or during the actually elapsed forward time if, as the case may be, the system detects that the battery seems to be fully recharged before the end of that period, it is not at the end of the forward duration, or also if the user voluntarily stops the recharging in progress and disconnects his vehicle.

In particular, in order to detect said time of ending of the power supply 71 of each battery 2 during its recharging, the system records the time from which the power-supply point 4 does no longer supply power to said battery 2. This interruption of electric-power consumption then results into the battery 2 having reached its maximum level of charge 21 and, thus, into its recharging time 7 being elapsed.

According to the preferred embodiment, the system 1 provides for detecting the absence of power consumption over a determined period of time after an already existing consumption. This period of time can vary from several minutes to several tens of minutes. This detection technique permits to eliminate periodical interruptions controlled by the power-supply points 4 over a recharging time 7, in order to ensure that the batteries 2 are maintained at a charging temperature that does not deteriorate them. In brief, these periodic interruptions allow time for each battery 2 to cool down before its next recharging step. The duration of these interruptions depends on the batteries and the manufacturers, but the invention provides for a longer period of time, in order to properly determine the end of the total charging time 7 and not the end of a partial recharging step.

In addition, since the system 1 according to the invention permits to detect the time of ending of the power supply 71 for the recharging being carried out, it can compare it with the forward recharging. In particular, if the consumption continues while the forward time of ending 71 is exceeded, then the system 1 records it, in order to update the data 9 for the next recharging. In brief, the system 1 does not stop the recharging in progress, but automatically causes the time 7 to evolve.

Thus, the actual time of ending of the power supply is then detected and recorded, changing the actually elapsed charging time before carrying out the recording of these data 9 for use at the time of the subsequent recharging operations.

The invention also consists in determining a schedule 11 for recharging several vehicles A, B, C, D by assembling the forward recharging times determined for each of their batteries 2. In brief, the processing means 10 apply the above-mentioned processing for each vehicle A, B, C, D, in order to determine a forward duration of power-supply for each of them.

It should be noted that the determination of this schedule does not require the vehicle to be present, but only to have already been recharged previously, possessing a data record relating to a previous recharging 9. Thus, the invention determines the planning of recharging of the vehicles that are likely to connect over a given period of time, e.g. a twenty-four hours day, a seven-days week, etc.

Preferably, the scheduling of said schedule 11 can occur by calculating the electric-power requirements needed for recharging each battery 2 over its forward duration of recharging, so that at any time the combination of said powers does not exceed the nominal power of said power-supply point 4. In brief, this optimization takes into account the maximum power the power-supply point 4 should not reach, in order to remain operational and not to be deteriorated.

When referring to the attached drawing, which schematically represents a non-restrictive example of the architecture of the management system 1, four vehicles A, B, C and D are connected to said power-supply point 4. Each of the four users 30, 31, 32, 33 of the corresponding vehicles 3 identified himself with the identification means 6 and electrically connected their respective vehicle.

The system 1 retrieves the data 9 already recorded with the recording means 8 for each user and thus of each battery 2, then processes them through means 10. A schedule 11 is then determined, in which appear the recharging durations 7 for each vehicle A, B, C, D. These durations 7 follow each other and overlap at least partially over time. In particular, for each duration 7, the system 1 determines a first time slot corresponding to its time of beginning of power supply 70.

Furthermore, depending on the data 9, the processing means 10 determine a second theoretical time slot corresponding to the time of ending of power supply 71 to each battery 2. It should be noted that this time of ending of power supply 71 is then a forward time, based on an already made previous recharging. Indeed, the system 1 does not know the current level of charge 20 of each battery 2 and therefore cannot determine this with certainty the time of ending 71.

In this respect, if data 9 are already recorded, then the system automatically determines a schedule 11, even if one single vehicle is connected and no other vehicle 3 is connected to the power-supply point 4 or if all vehicles are not connected thereto. In brief, the invention provides that the absent vehicles can be recharged later and contemplates such in the schedule 11 it determines and updates periodically.

Thus, the management system according to the invention can learn from the recharging operations already carried out and from the habits observed, in order to optimize the schedules for future recharging operations and to change them accordingly.

More particularly, the processing means 10 permit to determine an order of recharging of each vehicle A, B, C, D, as a function of said previous recharging data 9, conferring to system 1 a predictive nature.

Thus, based on records of previous recharging operations of each vehicle A, B, C, D, it is possible to change the schedule 11 and order of recharging for each of them.

In particular, it is possible to put earlier the recharging of a first vehicle relative to a second vehicle, depending on their previously recorded times of arrival and departure. By way of an example; a first vehicle arrived earlier, but likely to leave later will have its recharging delayed relative to the second vehicle arrived later, but for which it has been observed that it should usually leave earlier.

It should be noted that the system integrates the possibility for a user to override the recharging schedule by launching a forced recharging, which will directly launch its recharging when this forced recharging does not conflict with other recharging operations in progress, i.e. if there are currently no other recharging operations or if the recharging operations being carried out can be shifted in time, following each other and overlapping otherwise in time, while maintaining the forward time slots for ending each recharging.

The system 1 according to the invention has a nature of automatic intelligent learning relative to the behaviors and its users' recharging habits.

The invention permits to achieve an average improvement of at least 30% of the total duration for recharging all the vehicles 3.

I claim:

1. A method for dynamic and forward management of recharging of batteries with electric power, the method comprising the steps of:

associating a single power supply point with a plurality of vehicles, each vehicle being comprised of a rechargeable battery and a user;

electrically connecting each vehicle to said single power supply unit;

identifying each vehicle after the step of electrically connecting each vehicle, wherein the step of identifying each vehicle comprises the steps of:

retrieving a data record of a previous recharging of a respective battery by said single power supply unit, said data record being comprised of a recharging time duration, a beginning time of said recharging time duration, and an ending time of said recharging time duration; and confirming the vehicle, a respective battery, a respective user, and current charge status as confirmed data;

determining a forward duration, a forward beginning time of said forward duration, and a forward ending time of said forward duration for each vehicle based on recorded data of said single power supply unit and said confirmed data;

determining a schedule for each vehicle to recharge for a respective forward duration, wherein the step of determining a schedule comprises the steps of:

sequencing forward durations of each battery, said forward durations following each other and overlapping at least partially over time;

applying each forward duration from each respective forward beginning time to each respective forward ending time, each forward beginning time having an actual time set by said schedule; and recharging each vehicle according to a respective schedule at said single power supply unit.

2. The method for dynamic and forward management, according to claim 1, wherein the step of sequencing forward durations further comprises the steps of:

calculating electric power required for recharging each battery over a respective forward duration; and setting respective actual times for each forward duration, wherein electric power of each forward duration corresponds to nominal power of said power supply unit over all forward durations.

3. The method for dynamic and forward management, according to claim 1, the method further comprising the steps of:

deactivating said single power supply unit, after a last forward ending time of a respective battery in said schedule and a pre-determined period of time.

4. The method for dynamic and forward management, according to claim 1, wherein the step of identifying further comprises the steps of:

authenticating said respective user with a unique identifier; and confirming personal information of said respective user.

* * * * *